United States Patent
Civlin

(10) Patent No.: US 7,143,399 B2
(45) Date of Patent: Nov. 28, 2006

(54) METHOD AND APPARATUS FOR PREFETCHING MEMORY PAGES DURING EXECUTION OF A COMPUTER PROGRAM

(75) Inventor: Jan Civlin, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 659 days.

(21) Appl. No.: 10/354,331

(22) Filed: Jan. 29, 2003

(65) Prior Publication Data

US 2004/0148593 A1    Jul. 29, 2004

(51) Int. Cl.
G06F 9/45    (2006.01)
G06F 12/00    (2006.01)

(52) U.S. Cl. ........................ 717/140; 711/202

(58) Field of Classification Search ............... 717/151; 711/202, 137, 206, 213
See application file for complete search history.

(56) References Cited

U.S. PATENT DOCUMENTS

| | | | |
|---|---|---|---|
| 6,490,658 B1* | 12/2002 | Ahmed et al. | 711/140 |
| 6,886,085 B1* | 4/2005 | Shuf et al. | 711/159 |
| 6,970,985 B1* | 11/2005 | Moritz | 711/154 |
| 2004/0010675 A1* | 1/2004 | Moritz | 711/202 |
| 2004/0010777 A1* | 1/2004 | Klein | 717/127 |

OTHER PUBLICATIONS

Anderson et al. "Scheduler activations: effective kernel support for the user-level management of parallelism", ACM Transactions on Computer Systems, vol. 10 , Issue 1, Feb. 1992, pp. 53-79.*
Angela Demke Brown and Todd C. Mowry, "Taming the Memory Hogs: Using Compiler-Inserted Releases to Manage Physical Memory Intelligently", www.cis.upenn.edu/~davin/dslsem/20011019.ps.*

* cited by examiner

Primary Examiner—Wei Zhen
Assistant Examiner—Philip Wang
(74) Attorney, Agent, or Firm—Park, Vaughan & Fleming LLP; Edward J. Grundler

(57) ABSTRACT

One embodiment of the present invention provides a system that facilitates prefetching memory pages for a computer program. The system operates by analyzing the computer program within a compiler to identify memory pages accessed within a portion of the computer program. Next, the system creates a map of these memory pages accessed by the computer program, wherein the map is indexed by a program counter for the computer program. A given program counter value indexes memory pages within this map that are likely to be accessed during subsequent execution of the computer program. The system examines the map during execution of the computer program, and if the current program counter for the computer program indexes memory pages in the map, the system touches the memory pages, thereby causing the system to prefetch the memory pages.

18 Claims, 3 Drawing Sheets

METHOD AND APPARATUS FOR PREFETCHING MEMORY PAGES DURING EXECUTION OF A COMPUTER PROGRAM

BACKGROUND

1. Field of the Invention

The present invention relates to prefetching techniques to improve the performance of computer programs. More specifically, the present invention relates to a method and an apparatus for using compiler-generated information to facilitate prefetching memory pages during execution of a computer program.

2. Related Art

Recent increases in microprocessor clock speeds have not been matched by corresponding increases in memory access speeds. Hence, the disparity between microprocessor clock speeds and memory access speeds continues to grow. Execution profiles for fast microprocessor systems show that a large fraction of execution time is spent, not within the microprocessor core, but within memory structures outside of the microprocessor core. This means that microprocessors spend a large fraction of time stalled waiting for memory references to complete instead of performing computational operations.

The time it takes to complete a memory access can vary greatly because of the significant differences in access speeds between levels of the memory hierarchy. Memory accesses to Level 1 (L1) caches are very fast and typically do not slow the processor down. On the other hand, if the memory access causes a miss in L1 cache, the memory system attempts to access the target memory item in Level 2 (L2) cache, which can take many processor cycles and is likely to cause the processor to stall. If the access to L2 cache causes a miss, the memory system attempts to retrieve the target memory item from main memory, which takes hundreds of cycles and is very likely to cause the processor to stall. Finally, if the reference to main memory causes a page fault because the target memory item is not located in memory, a memory page containing code or data may have to be retrieved from disk, which can take tens of thousands of processor cycles and is almost certain to cause the processor to stall.

In an effort to mitigate this slowdown, computer designers have implemented hardware mechanisms that implement elaborate policies for implicit page prefetching. While somewhat useful, these hardware mechanisms are expensive to implement and are imprecise when determining which pages to prefetch.

Hence, what is needed is a method and an apparatus for prefetching memory pages that without the problems described above.

SUMMARY

One embodiment of the present invention provides a system that facilitates prefetching memory pages for a computer program. The system operates by analyzing the computer program within a compiler to identify memory pages accessed within a portion of the computer program. Next, the system creates a map of these memory pages accessed by the computer program, wherein the map is indexed by a program counter for the computer program. A given program counter value indexes memory pages within this map that are likely to be accessed during subsequent execution of the computer program. The system examines the map during execution of the computer program, and if the current program counter for the computer program indexes memory pages in the map, the system touches the memory pages, thereby causing the system to prefetch the memory pages.

In a variation of this embodiment, the portion of the computer program can include a program method, a function, or a subroutine.

In a further variation, the memory pages include code pages and data pages.

In a further variation, examining the map during execution of the computer program involves examining the map using a secondary thread that is synchronized with a program thread that is executing the computer program.

In a further variation, the secondary thread is a kernel thread.

In a further variation, the kernel thread executes when the computer program regains control after a thread swap.

In a further variation, touching the memory pages involves reading a memory location within each memory page.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Program

Figure 1:
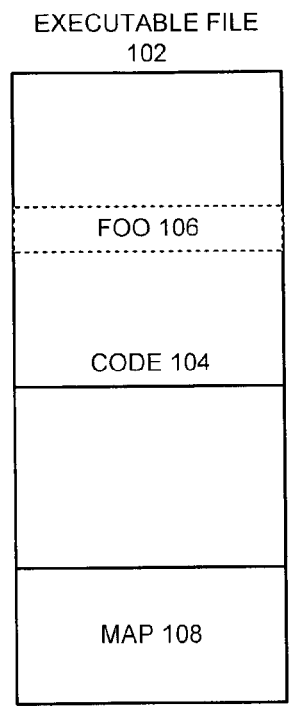
FIG. 1 illustrates an executable file for a program in accordance with an embodiment of the present invention.

FIG. 1 illustrates an executable file 102 for a program in accordance with an embodiment of the present invention. Executable file 102 includes code 104 and page map 108. Code 104 includes multiple independent sections of code, such as program methods, functions, and/or subroutines. For example, independent code section foo 106 is illustrative of one of these independent sections of code.

Page map 108 associates program counter values for the start of a section of code within the program to a list of memory pages that are likely to be required for that section of code to execute. For example, page map 108 associates the program counter value of the start of independent code section foo 106 with the memory pages required to execute independent code section foo 106. Note that these memory pages can include instruction pages and data pages.

Page Map

Figure 2:
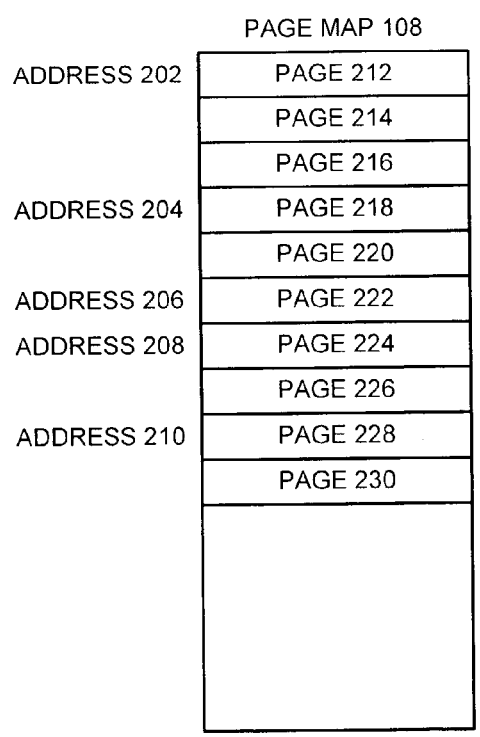
FIG. 2 illustrates a page map in accordance with an embodiment of the present invention.

FIG. 2 illustrates the structure of page map 108 in accordance with an embodiment of the present invention. Page map 108 includes a listing of memory pages indexed by program counter addresses. These program counter addresses are typically the starting address of an independent section of code, such as independent code section foo 106 from FIG. 1. As illustrated in FIG. 2, pages 212, 214, and 216 are indexed by address 202. This indicates that pages 212, 214, and 216 are used within the section of code starting at address 202. Similarly, pages 218 and 220 are used by the section of code starting at address 204, page 222 is used by the section of code starting at address 206, pages 224 and 226 are used by the section of code starting at address 208, and pages 228 and 230 are used by the section of code starting at address 210. Page map 108 can be extended to include any number of pages of code and any number of starting addresses.

This map is generated by a compiler and is supplied as part of the executable file 102 produced by the compiler. During execution of the program, the system compares the current program counter with the address values in page map 108. When a match is found, the system touches the pages associated with the matching address, thereby prefetching the pages into main memory (and cache memory) prior to when the pages are needed to execute the related program section.

Accessing the Page Map

Figure 3:
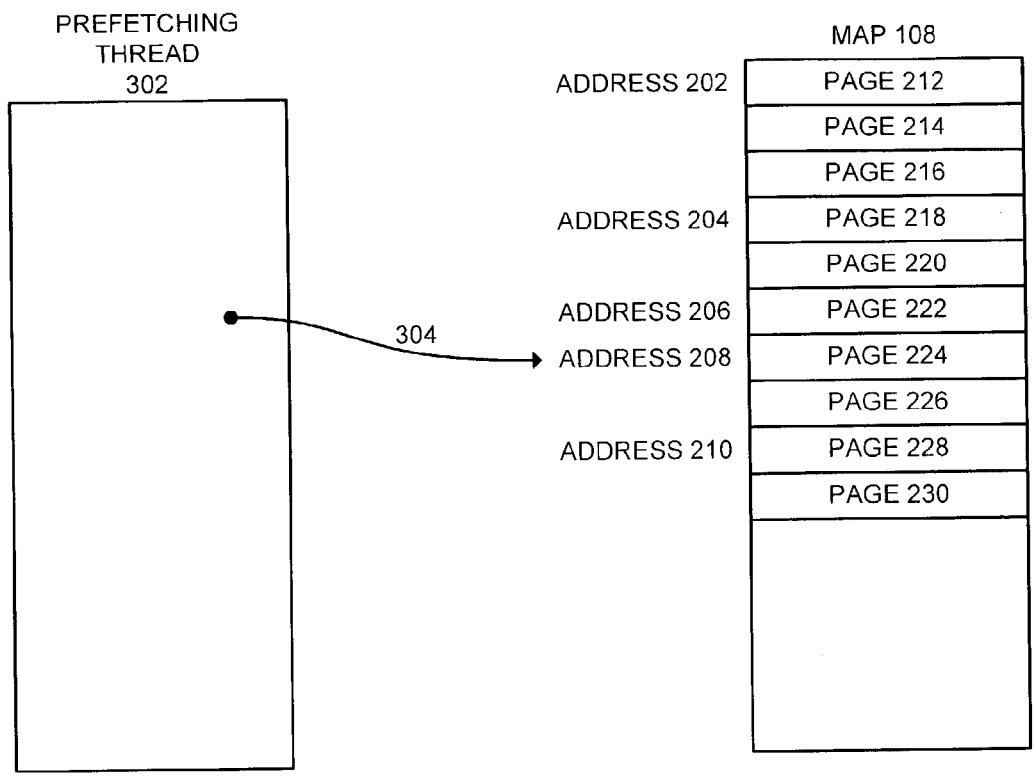
FIG. 3 illustrates the process of accessing a page map in accordance with an embodiment of the present invention.

FIG. 3 illustrates the process of accessing page map 108 in accordance with an embodiment of the present invention. Prefetching thread 302 is a thread of execution within the operating system kernel that is associated with a user thread that executes the program. During execution of a program, prefetching thread 302 runs each time the program regains control of the processor after a thread swap. Prefetching thread 302 examines the addresses within page map 108 and compares these addresses with the current program counter value. The current program counter value indicates the beginning of a particular section of code. If a match is found between the current program counter and an address within page map 108, prefetching thread 302 touches the memory pages listed at that address within page map 108.

In the example shown in FIG. 3, prefetching thread 302 has found a match 304 at address 208. This match indicates that the section of code starting at address 208 is about to access pages 224 and 226 from memory. In response, prefetching thread 302 reads a location from each page (touches each page) associated with address 208. This causes pages 224 and 226 to be loaded into main memory (or cache memory) prior to being needed to execute the section of code starting at address 208.

Creating a Page Map

Figure 4:
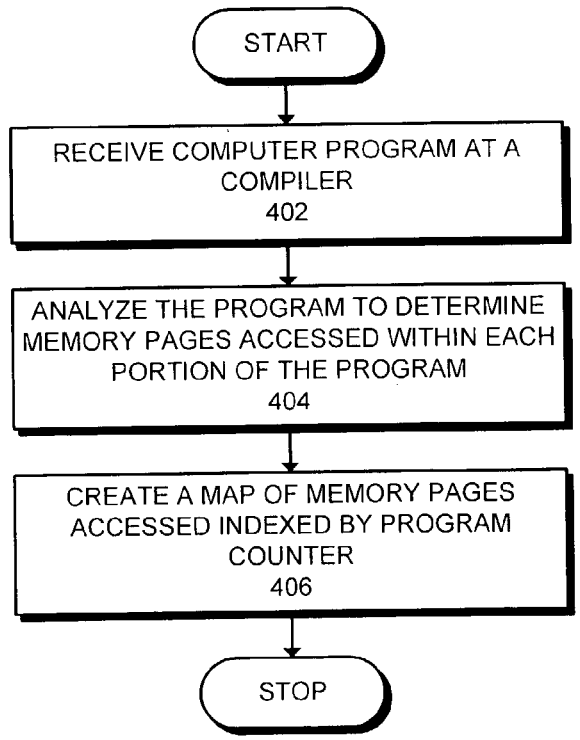
FIG. 4 presents a flowchart illustrating the process of creating a page map in accordance with an embodiment of the present invention.

FIG. 4 presents a flowchart illustrating the process of creating a page map in accordance with an embodiment of the present invention. The system starts when source code for a computer program is received at a compiler (step 402). Next, the compiler analyzes the program to determine which memory pages are likely to be accessed within each independent section of the program (step 404). This can involve examining branch targets, load addresses, and store addresses within the independent section of code. After determining which memory pages are likely to be accessed within each independent section of the program, the system creates a map of these memory pages indexed by program counter values at the beginning of the associated independent section of the program (step 406).

Prefetching Memory Pages

Figure 5:
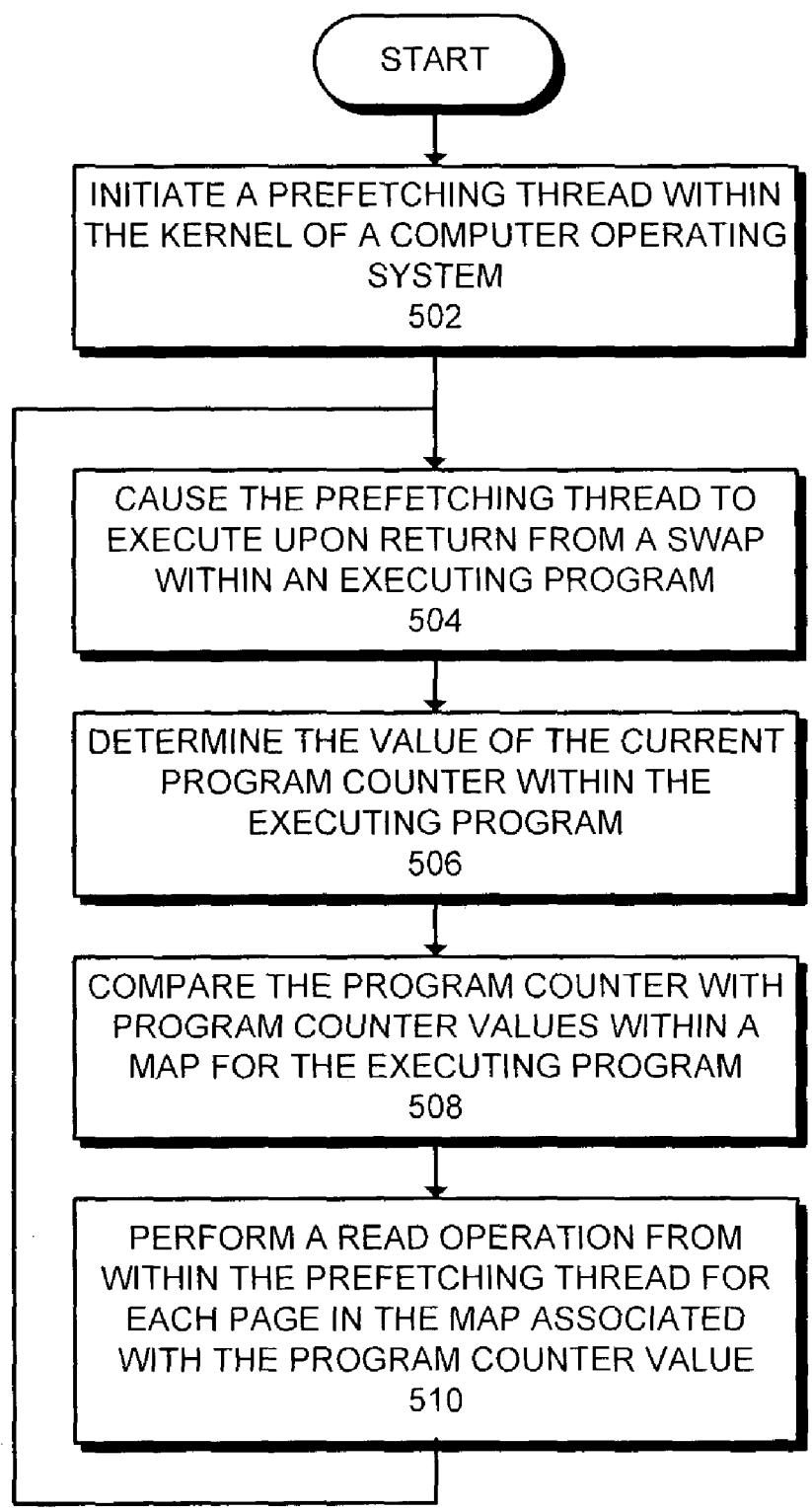
FIG. 5 presents a flowchart illustrating the process of prefetching memory pages in accordance with an embodiment of the present invention.

FIG. 5 presents a flowchart illustrating the process of prefetching memory pages in accordance with an embodiment of the present invention. The system starts when a prefetching thread is initiated within the kernel of a computer operating system (step 502). This prefetching thread executes upon return from a thread swap for an executing program (step 504). When the touching thread executes, it determines the value of the current program counter for the executing program (step 506). The system compares this current program counter value with address values in the map of memory pages created as described above in conjunction with FIG. 4 (step 508). If a match is found between the current program counter value and an address in the map of memory pages, the system performs a read operation on a memory location within each page associated with the current program counter (touches each page) thereby causing these pages to be loaded into cache memory (step 510). The system then returns to step 504 to await the next execution of the touching thread.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for prefetching memory pages for a computer program, comprising:
- analyzing the computer program within a compiler to identify memory pages that are likely to be accessed within a portion of the computer program;
- creating a map of the memory pages that are likely to be accessed by the computer program, wherein the map is indexed by a program counter for the computer program, so that a given program counter value indexes memory pages that are likely to be accessed after the program counter value is encountered during execution of the computer program;
- upon return from a thread swap during execution of the computer program, comparing the program counter value to entries in the map, wherein comparing the program counter value to entries in the map involves examining the map using a secondary thread that is synchronized with a program thread that is executing the computer program; and
- if the current program counter value indexes memory pages in the map,
  - touching the memory pages, so that the memory pages are prefetched before the computer program requires the memory pages, otherwise waiting for the next return from a thread swap to continue comparing the program counter value to entries in the map.

2. The method of claim 1, wherein the portion of the computer program can include a program method, a function, or a subroutine.

3. The method of claim 1, wherein the memory pages include code pages and data pages.

4. The method of claim 1, wherein the secondary thread is a kernel thread.

5. The method of claim 4, wherein the kernel thread executes when the computer program regains control after a thread swap.

6. The method of claim 1, wherein touching the memory pages involves reading a memory location within each memory page.

7. A computer-readable storage device storing instructions that when executed by a computer cause the computer to perform a method for prefetching memory pages for a computer program, the method comprising:

analyzing the computer program within a compiler to identify memory pages that are likely to be accessed within a portion of the computer program;

creating a map of the memory pages that are likely to be accessed by the computer program, wherein the map is indexed by a program counter for the computer program, so that a given program counter value indexes memory pages that are likely to be accessed after the program counter value is encountered during execution of the computer program;

upon return from a thread swap during execution of the computer program, comparing the program counter value to entries in the map, wherein comparing the program counter value to entries in the map involves examining the map using a secondary thread that is synchronized with a program thread that is executing the computer program; and if the current program counter value indexes memory pages in the map, touching the memory pages, so that the memory pages are prefetched before the computer program requires the memory pages, otherwise waiting for the next return from a thread swap to continue comparing the program counter value to entries in the map.

8. The computer-readable storage device of claim 7, wherein the portion of the computer program can include a program method, a function, or a subroutine.

9. The computer-readable storage device of claim 7, wherein the memory pages include code pages and data pages.

10. The computer-readable storage device of claim 7, wherein the secondary thread is a kernel thread.

11. The computer-readable storage device of claim 10, wherein the kernel thread executes when the computer program regains control after a thread swap.

12. The computer-readable storage device of claim 7, wherein touching the memory pages involves reading a memory location within each memory page.

13. A computing apparatus for prefetching memory pages for a computer program, comprising:

an analyzing mechanism configured to analyze the computer program within a compiler to identify memory pages that are likely to be accessed within a portion of the computer program;

a creating mechanism configured to create a map of the memory pages that are likely to be accessed by the computer program, wherein the map is indexed by a program counter for the computer program, so that a given program counter value indexes memory pages that are likely to be accessed after the program counter value is encountered during execution of the computer program;

a comparing mechanism configured to compare the program counter value to entries in the map upon return from a thread swap during execution of the computer program, wherein comparing the program counter value to entries in the map involves examining the map using a secondary thread that is synchronized with a program thread that is executing the computer program; and a touching mechanism configured to touch the memory pages, so that the memory pages are prefetched before the computer program requires the memory pages if the current program counter value indexes memory pages in the map, else waiting for the next return from a thread swap to continue comparing the program counter value to entries in the map.

14. The computing apparatus of claim 13, wherein the portion of the computer program can include a program method, a function, or a subroutine.

15. The computing apparatus of claim 13, wherein the memory pages include code pages and data pages.

16. The computing apparatus of claim 13, wherein the secondary thread is a kernel thread.

17. The computing apparatus of claim 16, wherein the kernel thread executes when the computer program regains control after a thread swap.

18. The computing apparatus of claim 13, further comprising a reading mechanism configured to read a memory location within each memory page to touch the memory pages.

* * * * *